United States Patent
Vernersson et al.

(10) Patent No.: US 12,306,031 B2
(45) Date of Patent: May 20, 2025

(54) CONTROL SYSTEM FOR ASSISTING AN OPERATOR OF A WORKING MACHINE, CORRESPONDING METHOD AND COMPUTER PROGRAM PRODUCT

(71) Applicant: Volvo Autonomous Solutions AB, Gothenburg (SE)

(72) Inventors: Krister Vernersson, Stenungsund (SE); Assar Martinsson, Braås (SE); Mikael Fransson, Eskilstuna (SE)

(73) Assignee: VOLVO AUTONOMOUS SOLUTIONS AB, Gothenburg (SE)

( * ) Notice: Subject to any disclaimer, the term of this patent is extended or adjusted under 35 U.S.C. 154(b) by 387 days.

(21) Appl. No.: 17/759,715

(22) PCT Filed: Jan. 31, 2020

(86) PCT No.: PCT/EP2020/052448
§ 371 (c)(1),
(2) Date: Jul. 28, 2022

(87) PCT Pub. No.: WO2021/151505
PCT Pub. Date: Aug. 5, 2021

(65) Prior Publication Data
US 2023/0064023 A1 Mar. 2, 2023

(51) Int. Cl.
*G01G 19/08* (2006.01)
*E02F 9/26* (2006.01)
*G01G 23/01* (2006.01)

(52) U.S. Cl.
CPC ........... *G01G 19/083* (2013.01); *E02F 9/264* (2013.01); *G01G 23/01* (2013.01)

(58) Field of Classification Search
CPC ........ G01G 19/083; E02F 9/264; G01G 23/01
USPC .......................................................... 177/139
See application file for complete search history.

(56) References Cited

U.S. PATENT DOCUMENTS

| | | | |
|---|---|---|---|
| 4,835,719 A | 5/1989 | Sorrells | |
| 4,921,578 A | 5/1990 | Shiraishi et al. | |
| 6,211,471 B1 | 4/2001 | Rocke et al. | |
| 7,908,048 B2 * | 3/2011 | Vigholm | F15B 21/14 701/41 |
| 8,515,627 B2 * | 8/2013 | Marathe | E02F 3/431 701/50 |
| 9,828,049 B2 * | 11/2017 | Lyle | E02F 9/08 |
| 11,536,008 B2 * | 12/2022 | Daimon | G01G 19/12 |
| 11,718,978 B2 * | 8/2023 | Shimano | E02F 3/38 701/50 |
| 11,965,318 B2 * | 4/2024 | Hofmann | E02F 9/265 |

(Continued)

FOREIGN PATENT DOCUMENTS

| | | | | |
|---|---|---|---|---|
| GB | 2482379 | * | 4/2011 | ............ G01M 99/00 |
| JP | 2017032493 A | | 2/2017 | |

OTHER PUBLICATIONS

Chinese Office Action dated Feb. 13, 2023 in corresponding Chinese Patent Application No. 202080094183.1, 18 pages.

(Continued)

*Primary Examiner* — Jacques M Saint Surin
(74) *Attorney, Agent, or Firm* — Venable LLP; Jeffri A. Kaminski (57) ABSTRACT

A control system for assisting an operator of a working machine, the working machine includes a bucket arranged to receive a load to be unloaded to a load receiving vessel.

18 Claims, 6 Drawing Sheets

(56) References Cited

U.S. PATENT DOCUMENTS

| | | |
|---|---|---|
| 2007/0135985 A1 | 6/2007 | Berry et al. |
| 2007/0260380 A1 | 11/2007 | Mintah et al. |
| 2015/0002303 A1 | 1/2015 | Stanley et al. |
| 2019/0176621 A1 | 6/2019 | Cardona |

OTHER PUBLICATIONS

European Communication pursuant to Article 94(3) EPC dated Feb. 26, 2024 in corresponding European Patent Application No. 20704215. 1, 6 pages.

International Search Report and Written Opinion in corresponding International Application No. PCT/EP2020/052448 mailed Oct. 1, 2020 (14 pages).

* cited by examiner

CONTROL SYSTEM FOR ASSISTING AN OPERATOR OF A WORKING MACHINE, CORRESPONDING METHOD AND COMPUTER PROGRAM PRODUCT

CROSS-REFERENCE TO RELATED APPLICATIONS

This application is a U.S. National Stage application of PCT/EP2020/052448, filed Jan. 31, 2020 and published on Aug. 5, 2021, as WO 2021/151505, all of which is hereby incorporated by reference in its entirety.

TECHNICAL FIELD

The present disclosure relates to a control system for assisting an operator of a working machine, the working machine comprising a bucket arranged to receive a load to be unloaded to a load receiving vessel. The present disclosure also relates to a method for operating the control system and to a computer program product.

BACKGROUND

Working machines comprising a bucket are commonly used for loading material to a load receiving vessel such as a dump truck or hauler. A wheel loader or an excavator may use the bucket to pick up material from a pile of material, transport it from the pile to a drop off or unload position wherein the bucket load is unloaded into a load receiving means of a load receiving vessel. On a hauling vehicle or an articulated hauler, the load receiving means may be the dump body or dump bed. During loading of the load receiving vessel a plurality of bucket loads is used to fill the load receiving means up to the desired level or desired payload.

However, the load receiving vessel typically has a rated maximum load carrying capacity, or weight of the load in the load receiving means the receiving vessel may carry during transport on-road or off-road. The rated maximum load may be based on mechanical design parameters and overloading the load receiving vessel may possibly in some situations result in failure of the load receiving vessel. Such failure may for example include structural issues with the chassis, the load receiving means or the driveline of the load receiving means. In addition, overloading may also lead to excessive vehicle component wear and increased service costs and/or decreased service life. For instance, overloading the load receiving vessel may lead to a significant increase in tire wear requiring premature fitting of new tires to a great cost. Accordingly, overloading is generally undesirable.

In addition to overloading the load receiving vessel, underloading the load receiving vessel, or loading the load receiving vessel to haul a weight below the load receiving vessel's rated payload capacity, is also not desirable in that productivity is decreased. More trips are needed to move a predetermined amount of material in the load receiving vessel, thereby increasing time needed as well as operating costs including fuel costs, service costs and labor costs. Accordingly, there is a desire to neither overload nor underload the load receiving vessel.

One solution presented to the problem of not overloading is disclosed in US20070135985, presenting a method of loading a bed on a truck with material using a loader comprising the steps of determining a target load for a final pass of the working machine. During the final pass, material is loaded from the pile into the bucket of the loader in excess of the target load. Excess material is thereafter dumped from the bucket of the loader back to the pile in a controlled manner in order to arrive at the target load for material in the bucket.

Subsequently the loader moves from the pile to the truck and unloads the bucket into the bed on the truck. The step of dumping some of the contents of the bucket back to the pile is controlled using a control arrangement controlling the pitch of the bucket.

However, such a solution involves an additional step for the operator to perform, thereby increasing the time needed to fill the load receiving vessel with the predetermined weight. With the above in mind, it would be desirable to provide further enhancements to the prior art, in a control system for assisting an operator of a working machine, that reduces the time needed to load a load receiving vessel in a manner that reduces the risk for both overloading and underloading the load receiving vessel.

SUMMARY

According to an aspect of the present disclosure, the above is at least partly alleviated by a control system for assisting an operator of a working machine, the working machine comprising a bucket arranged to receive a load to be unloaded to a load receiving vessel, the control system comprising processing circuitry arranged in communication with an operator interface, wherein the processing circuitry is adapted to: estimate a difference between a desired payload for the load receiving vessel and an accumulated weight of buckets of loads already unloaded to the load receiving vessel using the bucket, determine if the difference corresponds to an estimated weight for a fully loaded bucket or to an estimated weight for a half-loaded bucket, and instruct, using the operator interface and based on the determination, an operator of the working machine to unload a fully loaded bucket or a half-loaded bucket to the load receiving vessel.

The overall idea of the present disclosure is to determine, using a desired payload for the load receiving vessel and the weight of the already loaded material to the load receiving vessel, if the next bucket load is a final bucket load or not. If the next bucket load is a final bucket load, an indication in a comprehensible form such as visible or audible is given to the operator. The indication comprises an instruction with information about if the final bucket load should contain a fully loaded bucket or a half-loaded bucket. Providing this information to the operator of a working machine comprising the bucket used for loading the load receiving vessel allows for the final load of the load receiving vessel to be close to the desired payload of the load receiving vessel without the need for a complicated control arrangement as disclosed in the prior art. The general aim is thus to arrive close to the desired payload for the load receiving vessel as time efficient as possible in a manner that is simple and intuitive for an operator. The overall idea is further beneficial over the prior art in that little to no operator training is needed.

The working machine may be a wheel loader or an excavator comprising a bucket for moving material from a pile to the load receiving vessel and the control system may be arranged to the working machine or the control system may be arranged off-board the working machine. Additionally, the control system may be arranged on the load receiving vessel or may be arranged to a loading station.

The processing circuitry may in one embodiment be an electronic control unit (ECU), typically provided as an onboard component of the working machine. The ECU may be provided with sensor inputs from the load receiving vessel measuring a total load of material loaded to the load receiving vessel. The ECU may also be provided with data input measuring the load of each bucket unloaded to the load receiving vessel. In addition, the ECU may comprise means for communicating with additional sensors as well as with the working machine, an operator interface and/or a central control server of a worksite. If the working machine is remote controlled using a remote-control station, the ECU may be in communication with the remote control station. If the working machine is autonomously controlled, then the ECU may be in communication with the autonomous control system.

A desired payload may be communicated from the load receiving vessel to the control system. The desired payload may be a fixed numerical value based on a rated maximum load the receiving vessel may be loaded to. The desired payload may also be a value below the rated maximum load the load receiving vessel may be loaded to. The desired payload may be a range comprising a lower limit value and an upper limit value.

During loading of the load receiving vessel, the control system may estimate a difference between the desired payload of the load receiving vessel and an accumulated weight of bucket loads of material already unloaded to the load receiving vessel using the bucket of the working machine. For each load provided to the load receiving vessel the control system may add the weight of the material in the bucket to an accumulated weight value. The accumulated weight value may comprise the accumulated weight of buckets of loads unloaded to the load receiving vessel. The accumulated weight value may be compared to the desired payload weight in order to determine a difference. The difference may then be based on subtracting the accumulated weight value from the desired payload weight or may be based on dividing the accumulated weight value with the desired payload weight.

Based on estimating the difference between a desired payload for the load receiving vessel and an accumulated weight of buckets of loads already unloaded to the load receiving vessel using the bucket, the control system may determine if the difference corresponds to an estimated weight for a fully loaded bucket or to an estimated weight for a half-loaded bucket. The estimated weight for a half-loaded bucket may depend on the geometric shape of the bucket. For instance, the walls of the bucket may in some embodiments be tapered from the opening of the bucket to the bottom of the bucket. A visually sighted half-loaded bucket may thus not necessarily contain material having half the weight of a visually fully loaded bucket. The estimated weight for a half-loaded bucket may be half the weight of the weight of a fully loaded bucket. The estimated weight for a half-loaded bucket may be more, or less, half the weight of a fully loaded bucket. For instance, the weight of a half-loaded weight may be a bucket shape dependent factor in the range of 0.2 to 0.7 times the weight of a fully loaded bucket. The bucket shape dependent factor may be based on the geometry and volume of the bucket and may be a working machine predetermined value set by the manufacturer of the bucket and/or working machine and provided to the control system.

Based on determining, if the difference corresponds to an estimated weight for a fully loaded bucket or to an estimated weight for a half-loaded bucket, the control system may instruct, using an operator interface and based on the determination, an operator of the working machine to unload a fully loaded bucket or a half-loaded bucket to the load receiving vessel. The instruction to the operator may for example be in the form of a visual or an audible indication, or alternatively a combination thereof. Other forms of instructing the operator are also conceivable. If the working machine is an autonomous working machine the instruction may be in the form of e.g. a machine-readable instruction and/or a control signal sent from the control system to the autonomous control system. It should thus be understood that the expression "operator" should be interpreted broadly, and may thus include an implementation where the operator is an autonomous operator (as compared to a human).

In case of a manually operated working machine, the operator interface may be arranged inside the cab of the working machine and may be a display, a control light or form part of a set of control lights. The interface may also be arranged outside of the vehicle and may give an indication to surrounding working machines that the working machine is adding a final bucket load to the load receiving load vessel. As such, the instruction may give an indication to other working machines comprising load receiving vessels that loading of the currently being loaded working machine and load receiving vessel is almost complete and that loading of the subsequent working machine may soon commence.

In an embodiment, the processing circuitry only determines the difference if the accumulated weight of buckets of loads already unloaded to the load receiving vessel exceeds a predetermined threshold. The processing load on the processing circuit may be decreased by only determining, if the difference between a desired payload for the load receiving vessel and an accumulated weight of buckets of loads already unloaded to the load receiving vessel using the working machine bucket, corresponds to an estimated weight for a fully loaded bucket or to an estimated weight for a half-loaded bucket, is above a predetermined threshold. For instance, doing the comparison after unloading the first of a plurality of buckets of loads may be unnecessary processing for the processing circuitry.

The predetermined threshold may be a predetermined value preprogrammed to the processing circuitry of the control system prior to operation of said control system. The predetermined value may further be a range of values comprising a lower limit value and an upper limit value. For instance, the lower limit value may be 50% and the upper limit value may be 80%. In a further embodiment, the predetermined threshold may be determined by the processing circuitry prior to starting to load the load receiving vessel using the working machine. In a further embodiment, the predetermined threshold may be a dynamic value, that may change during the loading of the load receiving vessel. In a further embodiment, the predetermined threshold may be set by the working machine operator and the threshold may be increased or decreased dependent on the working machine operator proficiency or skill. For example, a lower predetermined threshold may be set when the working machine operator is an unexperienced operator and a higher predetermined threshold may be set when the working machine operator is an experienced operator.

In an embodiment, the predetermined difference is at least more than 80% of the desired payload for the load receiving vessel. Accordingly, the difference may be at least 80% or higher in order for the step of determining, if the difference corresponds to an estimated weight for a fully loaded bucket or to an estimated weight for a half-loaded bucket, is performed. The predetermined difference may also be at least more than 50%, at least more than 60%, at least more than 70%. The predetermined difference may depend on the type of load. The predetermined difference may depend on the density of the material being loaded to the load receiving vessel. In one example, the predetermined difference may be lower than 80% if the material being loaded has a high density. This may further reduce the risk of overloading the load receiving vessel.

In a further embodiment, the processing circuitry may be further adapted to determine if the difference corresponds to an estimated weight for a quarter-loaded bucket or to an estimated weight for a three quarter-loaded bucket, and instruct, using the operator interface and based on the determination, an operator of the working machine to unload a quarter-loaded bucket or a three quarter-loaded bucket to the load receiving vessel. In order to further reduce the risk of overloading or underloading the load receiving vessel the control system may determine if the difference corresponds to the weight of a quarter-loaded bucket or a three quarter-loaded bucket and instruct the operator that the final bucket is a quarter-loaded bucket or a three quarter-loaded bucket. The control system may not necessarily be limited to only determining and instructing the operator to load a fully loaded bucket or a half-loaded bucket to the load receiving vessel but may further be adapted to determine and instruct the operator to load a quarter-loaded bucket or a three quarter-loaded bucket.

In one embodiment, the processing circuitry may be further adapted to receive an indication of a weight of the load currently within the bucket and receive an indication of a weight of the load currently received at the load receiving vessel. The weight of the load currently within the bucket may be measured using bucket load sensor arrangement according to the present art. The weight of the load currently received at the load receiving vessel may be measured using load receiving vessel sensors. The measured weight of the load currently within the bucket and the weight of the measured load currently in the load receiving vessel may be communicated to the processing circuitry.

Preferably, the control system comprises the operator interface. For instance, the operator interface and control system may be in the form of a mobile computing unit, a tablet computer or a mobile smartphone. The control system may be in the form of a kit of parts that may be retrofitted to the working machine. The kit of parts may be in the form of a mobile computing unit comprising the processing circuitry, communication means for receiving the desired payload for the load receiving vessel, the accumulated weight of buckets already loaded to the load receiving vessel, the weight of material loaded into a bucket, and the operator interface.

In an embodiment, the operator interface is adapted to provide at least one of a visual, audio and haptic-based indication to the operator. As earlier disclosed, the operator interface may be a display such as a computer monitor. The display may be in the form of the working machine dashboard display or may be a separate display mounted in the cab of the working machine adapted to provide visual indications to the operator. The interface may also be one, or a set of indication lights. The indication lights may form part of the working machine operator dashboard cluster or may be arranged in a separate housing and mounted inside or outside the cab. The set of lights may comprise a first light indicating that loading of the load receiving vessel should start and/or continue, a light indicating that the current bucket load is a final bucket load and/or that the next bucket should be a fully loaded or a half-loaded bucket. The lights may be of different colors. For instance, the colors may be green, yellow and/or red.

Alternatively, only a single light may be used to provide the operator with the indication. In such an example the one light may be able to change color of the light or shine intermittently in a predetermined pattern such as pulsate with different tempos and/or patterns. The operator interface may also be in the form of a speaker providing audio indications to the operator. The audible indications may be in the form of different sounds or sounds with different tempos and/or patterns. The audible instructions may also be in the form of pre-recorded language voice commands.

The operator interface may also be adapted to provide haptic-based indication to the operator such as a means to vibrate a control lever or joystick, an armrest, a chair or any other object in physical contact with the operator. For instance, the haptic-based indication to the operator may involve modulating the hydraulic pressure provided to the bucket hydraulic lift cylinder in order to induce a motion in the working machine and/or the bucket lift control lever or joystick.

In an embodiment, the interface comprises a first and a second light source, the first light source provided for indicating a fully loaded bucket and the second light source provided for indicating a half-loaded bucket. The lights may be switched off until the control system determines that the next bucket load is a final bucket load. The number of lights may correspond to the number of predetermined load levels of the final bucket load. If the control system is adapted to instruct the operator that the final bucket load is a fully loaded bucket, a three quarter-loaded bucket, a half-loaded bucket or a quarter-loaded bucket, the interface may comprise four separate light sources.

According to one embodiment, the estimated weight for a fully loaded bucket corresponds to the heaviest bucket load of a plurality of consecutive bucket loads. During loading of the load receiving vessel the weight of each bucket load provided to the load receiving vessel may be determined and the heaviest bucket load may be used to estimate the weight for a fully loaded bucket. This may provide a safety factor for not overloading the load receiving vessel when the last bucket is a fully loaded bucket. This may also provide a safety factor for not underloading the load receiving vessel when the last bucket is a fully loaded bucket.

According to another embodiment, the estimated the weight for a fully loaded bucket may correspond to an average of a plurality of consecutive bucket loads. The average may be calculated by adding the weights of the plurality of consecutive bucket loads and dividing by the number of consecutive bucket loads. This may allow for the final load in the load receiving vessel to be as close to the desired payload as possible while reducing underloading and/or overloading.

In some embodiments of the present disclosure, the control system may be provided as a component of a working machine, where the working machine further comprises means for determining a weight of the load currently within the bucket. The working machine may be in the form of a wheel loader or a front loader having means for determining the weight of the load currently within the bucket. A wheel loader may also be referred to as bucket loader, front-end loader, payloader, scoop, shovel, skip loader, wheel loader, or skid-steer. The working machine may also be an excavator or a digger.

As an alternative, the control system may possibly for part of a load receiving vessel comprising a load receiving means and means for determining a weight of the load currently received at the load receiving means. The load receiving means may be in the form of a load receiving volume for receiving a load of material and holding said material during transport. For an articulated hauler the load receiving means may be referred to as the body or bed.

The means for determining the weight of the load currently received at the load receiving means may be in the form of load sensors attached to the supports holding the load receiving means. In one embodiment the wherein the load receiving vessel is in the form of an articulated hauler the means for determining a weight of the load currently received at the load receiving means may be weight or load sensors attached to the suspensions struts or attached to the hydraulic lifting cylinders and the dump body to chassis pivoting joint.

According to one embodiment, the load receiving vessel is a hauler. The load receiving vessel may be in the form of an articulated-hauler, articulated dump truck (ADT), or a dump hauler also referred to as a dumper. The load receiving vessel may also be in the form of a semi-truck or lorry comprising a trailer with a load receiving means.

Additionally, the load receiving vessel may in an alternative embodiment be a railway wagon comprising a load receiving means.

As an alternative, the control system may possibly for part of a loading station comprising a weighing arrangement for receiving the load receiving vessel, said weighing arrangement communicatively coupled to the processing circuitry, wherein the processing circuitry is further adapted to determine a weight of the load currently received at the load receiving vessel. The loading station may be a predetermined station for loading a load receiving vessel. Such a loading station may form part of a processing plant wherein the location for loading the load receiving vessel does not change. In one, non-limiting example, the loading station comprises a scale onto which the load receiving vessel parks on while loading the load receiving vessel. The loading station receives the load receiving vessel and weighs the load provided to the load receiving vessel and communicates the weigh to the processing circuitry.

According to another aspect of the present disclosure, a method for operating a control system arranged to assist an operator of a working machine is disclosed, the working machine comprising a bucket arranged to receive a load to be unloaded to a load receiving vessel, the control system comprising processing circuitry arranged in communication with an operator interface, wherein the method comprises the steps of estimating, using the processing circuitry, a difference between a desired payload for the load receiving vessel and an accumulated weight of buckets of loads already unloaded to the load receiving vessel using the bucket, determining, using the processing circuitry, if the difference corresponds to an estimated weight for a fully loaded bucket or to an estimated weight for a half-loaded bucket, and instructing, using the operator interface and based on the determination, an operator of the working machine to unload a fully loaded bucket or a half-loaded bucket to the load receiving vessel. Effects and advantages of this aspect of the present disclosure are largely analogous to those discussed above in relation to the previous aspect of the present disclosure.

According to one embodiment, the method further comprises the step of: comparing the estimated difference with a predetermined threshold, wherein the steps of determining and instructing are only performed if the estimated difference is above the predetermined threshold. The method may comprise the step of comparing the estimated difference, between the desired payload for the load receiving vessel and an accumulated weight of buckets of loads already unloaded to the load receiving vessel using the bucket, to a predetermined threshold and only performing the step of determining and instructing if the estimated difference is above the predetermined threshold.

The predetermined threshold may be a predetermined value preprogrammed to the processing circuitry of the control system prior to operation of said control system. The predetermined value may further be a range of values comprising a lower limit value and an upper limit value. For instance, the lower limit value may be 50% and the upper limit value may be 80%. In a further embodiment, the predetermined threshold may be determined by the processing circuit prior to starting to load the load receiving vessel using the working machine. In a further embodiment, the predetermined threshold may be a dynamic value, that may change during the loading of the load receiving vessel. In a further embodiment, the predetermined threshold may be set by the working machine operator and the predetermined threshold may be increased or decreased dependent on the working machine operator proficiency or skill.

According to one embodiment, the method may further comprise the step of determining the predetermined threshold. The predetermined threshold value may be determined based on the desired payload and the weight of a first bucket load unloaded to the load receiving vessel.

According to one embodiment, the threshold value is at least more than 80% of the desired payload for the load receiving vessel. The predetermined threshold may be a factor of the desired payload for the load receiving vessel. 80% indicates that the predetermined threshold is 0.8 time the desired payload for the load receiving vessel. Other ways of expressing the predetermined threshold in relation to the desired payload are also possible. Additionally, the predetermined threshold may depend on an estimation of the number of buckets of load required to load the load receiving vessel with the desired payload. As a non-limiting example, if the estimated number of buckets of load is five, the predetermined threshold may be three (60%), whereas if the estimated number of buckets is fifteen the predetermined threshold may be twelve (80%). If the predetermined threshold is set too high, and the amount of bucket loads needed to load the load receiving vessel with the desired payload is low, there is a risk of overloading the load receiving vessel.

According to one embodiment, the predetermined threshold is at least more than 50% of the desired payload for the load receiving vessel.

According to one embodiment, the method further comprising the steps of receiving, at the processing circuitry, an indication of a weight of the load currently within the bucket, and receive, at the processing circuitry, an indication of a weight of the load currently received at the load receiving vessel. The processing unit may use bucket load sensing data comprising the weight of the load currently in the bucket as well as data for the load currently received at the load receiving vessel in order to determine if the next bucket is a final bucket and if the final bucket should be a fully loaded bucket or a half-loaded bucket. This step may be done once for every bucket load provided to the load receiving vessel. Additionally, this step may be done continuously during the loading of the load receiving vessel.

According to a further aspect of the present disclosure, a computer program product is disclosed, said computer program product comprising a non-transitory computer readable medium having stored thereon computer program means for operating a control system arranged to assist an operator of a working machine, the working machine comprising a bucket arranged to receive a load to be unloaded to a load receiving vessel, the control system comprising processing circuitry arranged in communication with an operator interface, wherein the computer program product comprises: code for estimating, using the processing circuitry, a difference between a desired payload for the load receiving vessel and an accumulated weight of buckets of loads already unloaded to the load receiving vessel using the bucket, code for determining, using the processing circuitry, if the difference corresponds to an estimated weight for a fully loaded bucket or to an estimated weight for a half-loaded bucket, and code for instructing, using the operator interface and based on the determination, an operator of the working machine to unload a fully loaded bucket or a half-loaded bucket to the load receiving vessel. Effects and advantages of this aspect of the present disclosure are largely analogous to those discussed above in relation to the previous aspects of the present disclosure.

The computer readable medium may be any type of memory device, including one of a removable nonvolatile random-access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1A:
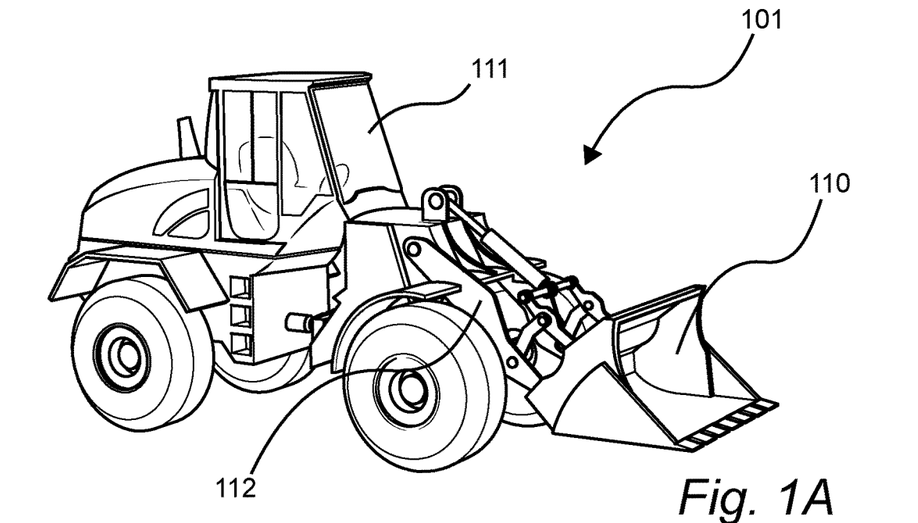
FIGS. 1A-1D illustrates a wheel loader, an articulated hauler, a loading station in which the control system according to the present disclosure may be incorporated, and a fully loaded and a half-loaded bucket.

FIG. 1A shows an illustration of a working machine in the form of a wheel loader 101, where a control system 150 according to an embodiment of the present disclosure may be arranged as an onboard component. The wheel loader 101 further comprises a bucket 110 for picking up material from a pile and unloading it to the bed or body of a load receiving vessel 102. The wheel loader 101 may optionally comprise means for measuring a weight of material contained in the bucket (not shown). In FIG. 1A, the wheel loader 101 is further equipped with a wheel loader cab 111, e.g. for housing an operator during operation of the wheel loader.

Figure 1B:
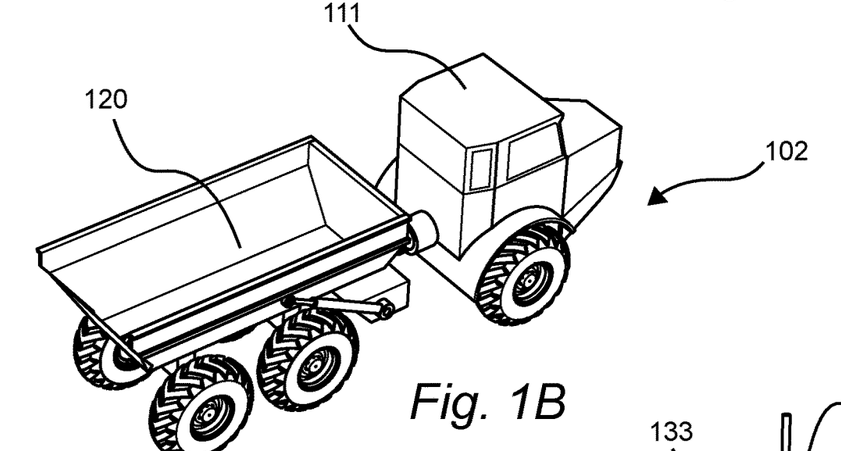

FIG. 1B shows an illustration of a load receiving vessel 102 in the form of an articulated hauler 102, comprising a body or bed 120 for holding and transporting material unloaded from a working machine bucket 110. The control system 150 may also in this embodiment be provided as an onboard component. The articulated hauler 102 may additionally comprise means for measuring the weight of material loaded to the body or bed 120 of the articulated hauler. FIG. 1B further shows a cab 121 for an operator of the articulated hauler 102.

Figure 1C:
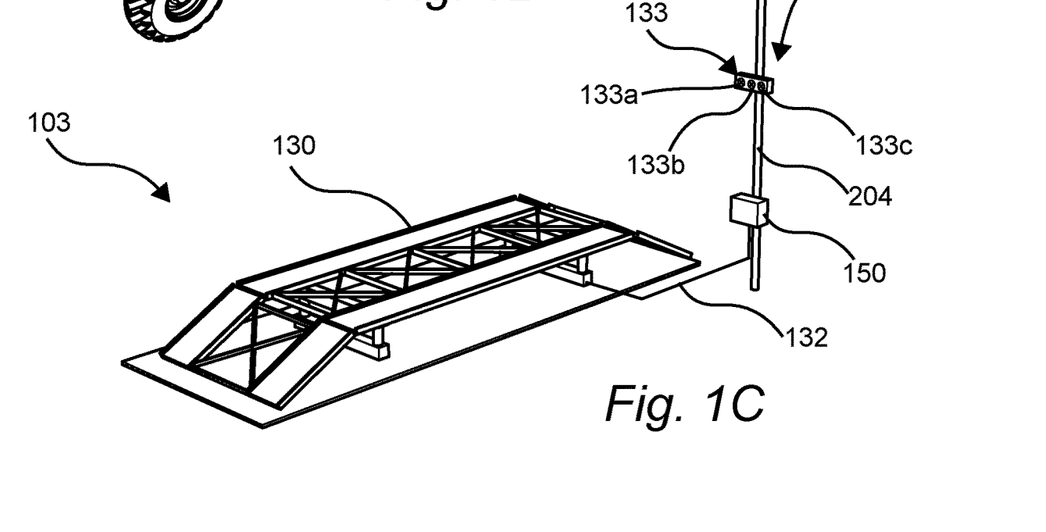

FIG. 1C shows an illustration of a loading station 103 comprising a weighing platform 103 for a load receiving vessel to be placed on during loading of the load receiving vessel. The load receiving vessel may be in the form of the articulated hauler 102 as shown in FIG. 1B. During loading of the articulated hauler 102, the articulated hauler 102 drives onto the weighing platform 130 and loading of the articulated hauler 102 using a working machine such as the wheel loader 101 of FIG. 1A having a bucket 110 commences. The weighing platform 130 shown in FIG. 1C further comprises means for weighing the articulated hauler 102 during the loading process. The means for weighing may be any commonly used loading station 103 weighing means. The means for weighing communicates through a wired connection 132 with the control system 150 provided in line with the present disclosure.

During each load of material from the wheel loader 101, the total accumulated weight of the articulated hauler 102 is communicated to the control system 150. The control system 150 subtracts the weight of the articulated hauler 102 in order to determine a total accumulated load of material loaded to the articulated hauler 102. The weight of the articulated hauler 102 may be determined by the weighing means prior to starting the loading of material by the wheel loader 101 to the articulated hauler 102. FIG. 1C shows a stationary housing 131 connected to the control system 150 through a data bus cable 204. The stationary housing 131 is shown as having three lights 133. The stationary housing 131 is arranged in close vicinity to the loading station 103.

During loading of the articulated hauler 102, when the control system 150 determines that the final bucket is a fully loaded bucket 113 or a half-loaded bucket 114, a light 133 is activated to indicate to the operator of the wheel loader 101 that a fully loaded 113 or a half-loaded 114 bucket should be loaded to the articulated hauler 102. A first light 133a activates to indicate to the operator of the wheel loader operator to continue the loading of the articulated hauler 102. During loading of the articulated hauler 102, the control system 150 may determine that the next bucket is a final bucket and that the final is a half-loaded bucket 114, the control system 150 activates a second light 133b to indicate to the operator that the next bucket is a half-loaded bucket 114. When the control system 150 determines that the next bucket is a fully loaded bucket 113 the control system activates a third light 133c to indicate to the operator that the next bucket is a fully loaded bucket 113. When the second light 133b or third light 133c activates the operator of the articulated hauler 102 is given an indication that the loading of the articulated hauler 102 is almost complete and the operator may prepare the articulated hauler 102 for transport from the loading station 103.

Figure 3:
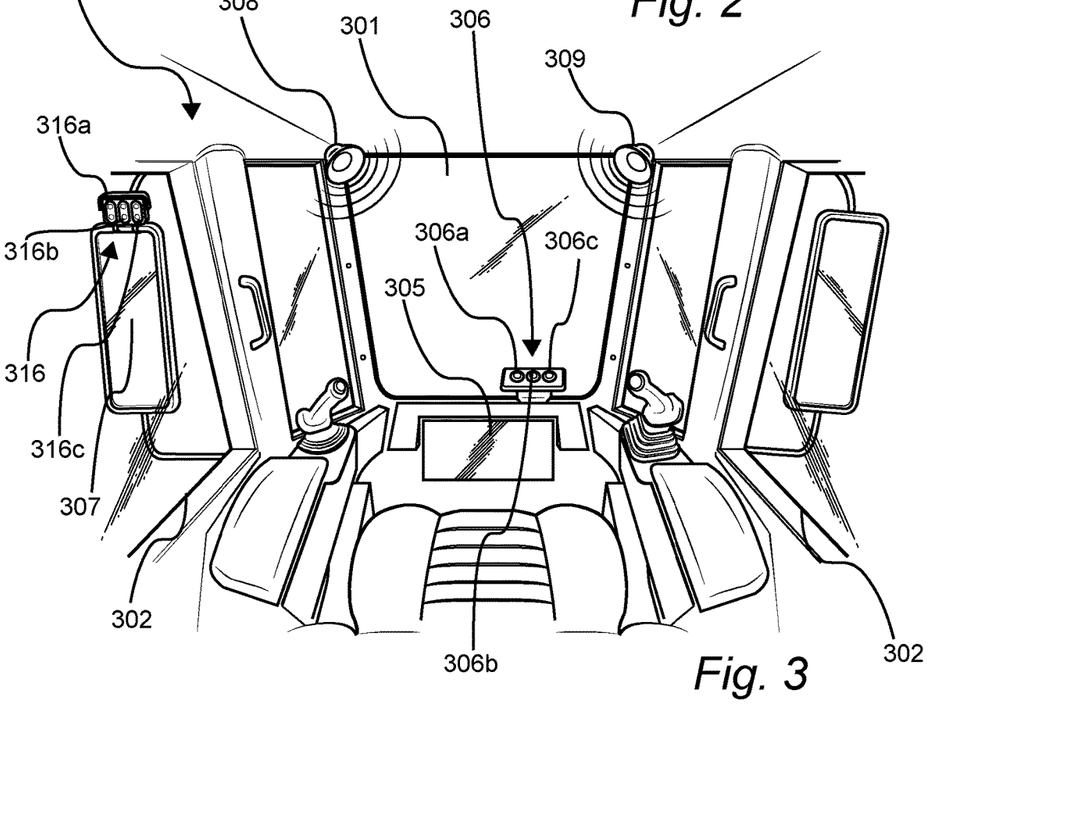
FIG. 3 illustrates operator interfaces of working machine cab.

However, the control system 150 of the loading station 103 may instead or additionally be in wireless communication with the wheel loader 101 and the control system 150 may send a control signal to an operator interface arranged on the wheel loader 101 or the articulated hauler 102 such as disclosed in FIG. 3. After finishing the loading of the articulated hauler 102 drives off the loading station 103 and another articulated hauler may drive onto the loading station 103 to be loaded by the wheel loader 101.

Figure 1D:
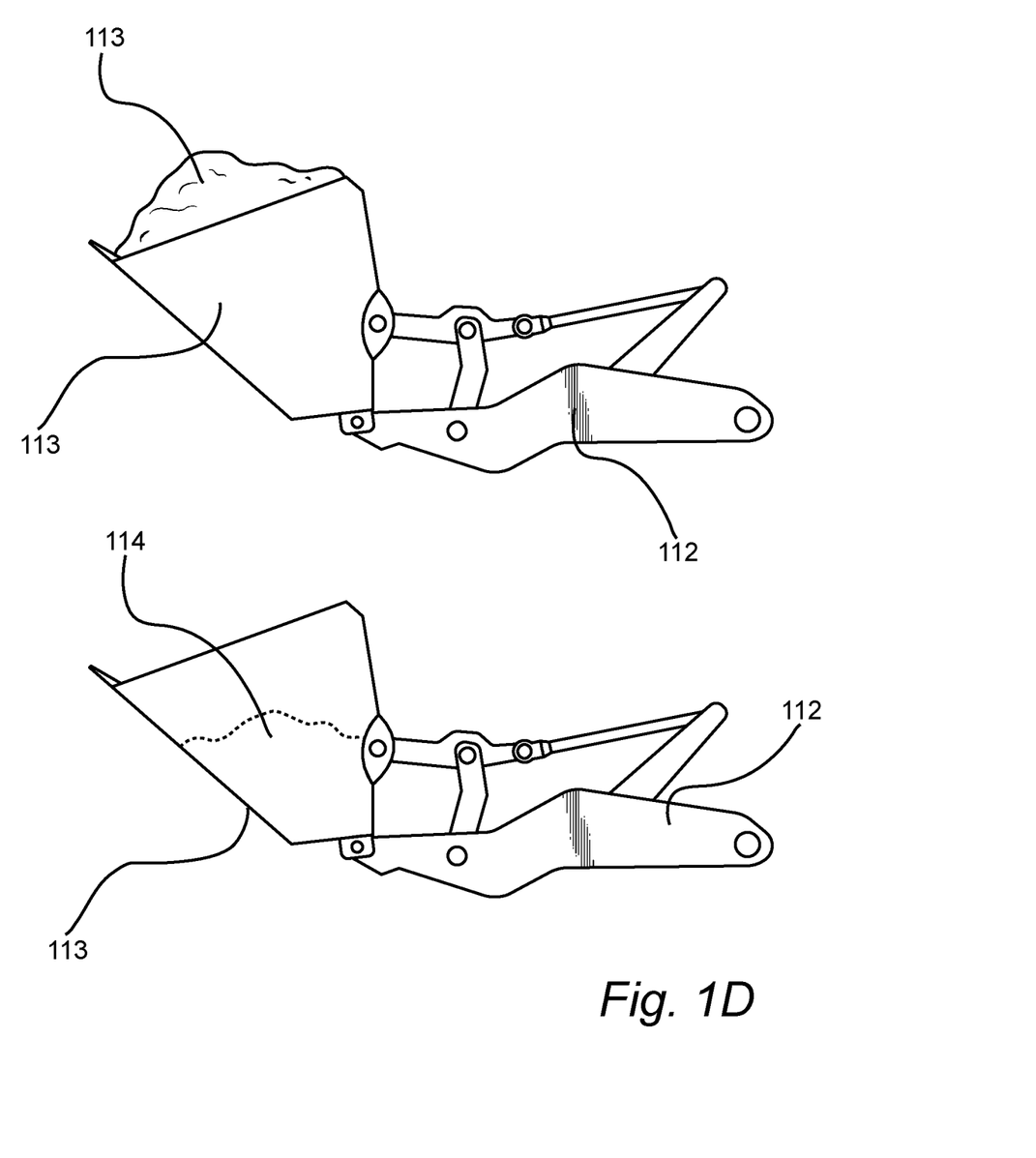

FIG. 1D illustrates a bucket 110 and a boom 112 forming part of the wheel loader 101 in FIG. 1 comprising a fully loaded bucket 113 and a half-loaded bucket 114.

Figure 2:
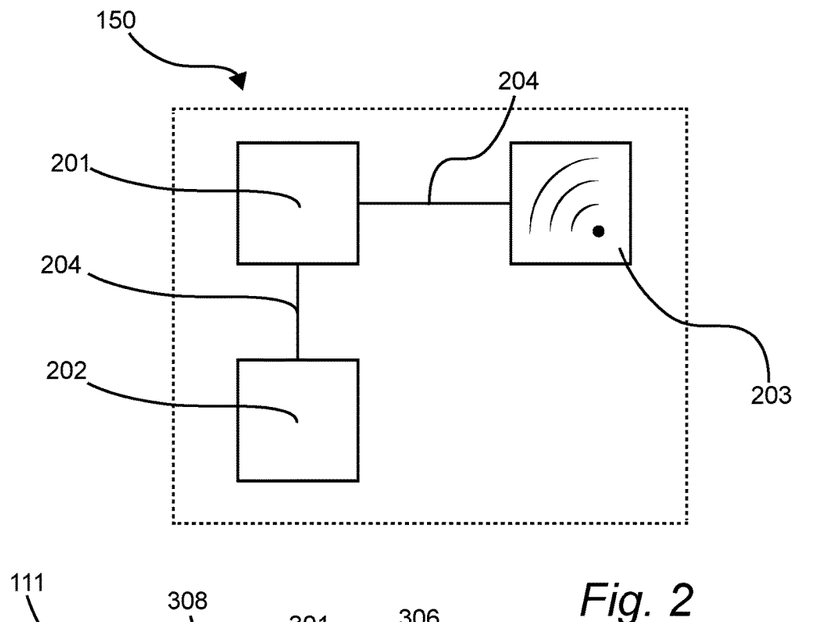
FIG. 2 shows a schematic view of the parts of the control system.

FIG. 2 shows a possible implementation of the control system 150 provided in line with the present disclosure, for assisting an operator of a wheel loader 101 during loading of a load receiving vessel, such as an articulate hauler 102 shown in FIG. 1B. As shown in FIG. 2, the control system 150 comprises a processing circuitry 201.

For reference, the processing circuitry 201 may for example be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein. For reference, the processing circuitry 201 may in some embodiments form part of an electronic control unit (ECU), for example provided as an onboard component of a working machine provided in line with the present disclosure The control system 150 also comprises a communication unit 203 in the form of a wired or wireless communication interface, where examples of wireless communication interfaces may include e.g. using communication protocols such as V2V, V2X, WIFI, 3G, 4G, or 5G. The communications unit 203 may be in connection with an off-site server in order for logging the loading of load receiving vessels 102. The control system 150 also comprises an operator interface 202 connected to the processing circuitry 201. The operator interface 202 is shown being in wired connection to the processing circuitry 201, however the operator interface 202 may also be in wireless connection to the processing circuitry 201. The operator interface 201 may be a device adapted to provide at least one of a visual, audio and haptic-based indication to the operator. Examples of the operator interface 201 are disclosed in relation to FIG. 3.

FIG. 3 shows a simplified perspective view of the cab 111 for a working machine in the form of a wheel loader 101 or an articulated hauler 102 as disclosed in FIG. 1A or FIG. 1B. FIG. 3 shows the view as seen from the eyes of the operator and shows a front windscreen 301 as well as side windows 302. The cab is further arranged having a dashboard (not shown) having a plurality of gauges for providing the operator with working machine data such as engine RPM, working machine speed and hydraulic pressure. The vehicle cab is further shown having a digital display 305 for displaying additional information for the operator of the working machine 101, 102. In addition, the digital display 305 is arranged to display information about the loading of a load receiving vessel 102 such as the articulated hauler 102. The digital display 305 is further programmed to display the instruction to the working machine operator if the next bucket is a half-loaded bucket 114 or a fully loaded bucket 113 and may for simplicity be referred to as an operator interface 202. The indication of the digital display 305 may be in the form of a text message or in the form of digital representations of the lights 133 disclosed in relation to FIG. 1C.

Additionally, or alternatively to providing the operator interface 202 for the indication to the working machine operator using the digital display 305, the cab 111 for the working machine in FIG. 3 is shown having a first housing 306 comprising a first 306a, a second 306b and a third 306c light source. FIG. 3 further shows a second housing 316 for three light sources 316a, 316b, 316c mounted to one side mirror 307 of the working machine 101 thereby providing an indication not only to the working machine operator but also to surrounding vehicles.

FIG. 3 also disclosed a first and a second speaker 308, 309, arranged to provide an audio indication to the operator of the working machine. The audio indication may take the form of a pre-recorded audio message played to indicate to the working machine operator that the next bucket is a half-loaded 114 or a fully loaded bucket 113. FIG. 3, shows a plurality of means for indicating to the working machine operator that the next bucket is a half-loaded bucket 115 or a fully loaded bucket 114. However, only one means for indicating to the working machine operator needs to be present. Preferably, both a means for providing a visual indication and an audio indication is present.

Figure 4A:
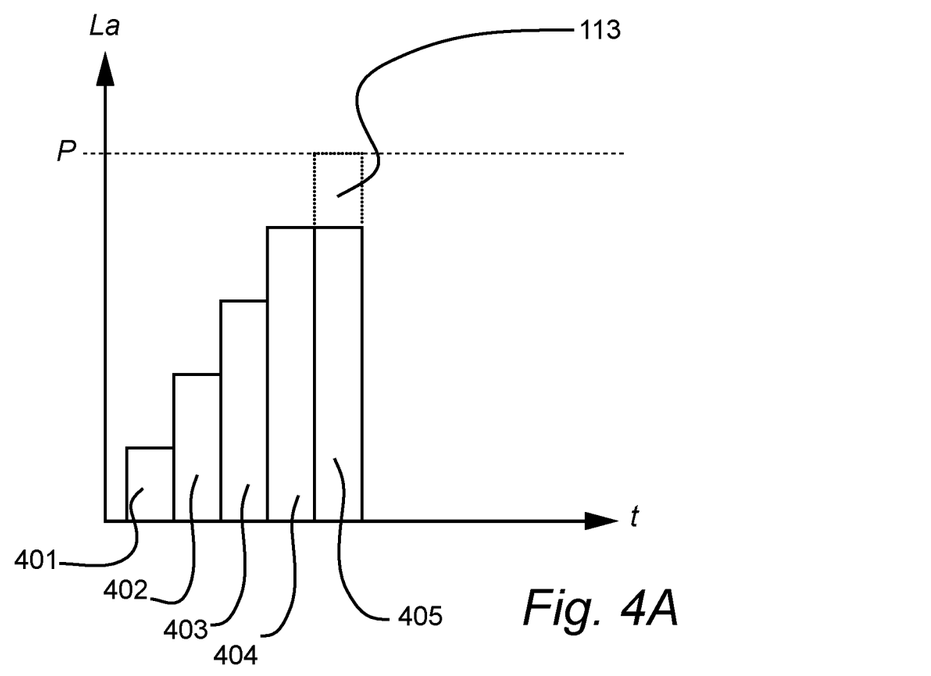
FIG. 4A-4C shows graphs exemplifying the operation of the control arrangement.
Figure 4B:
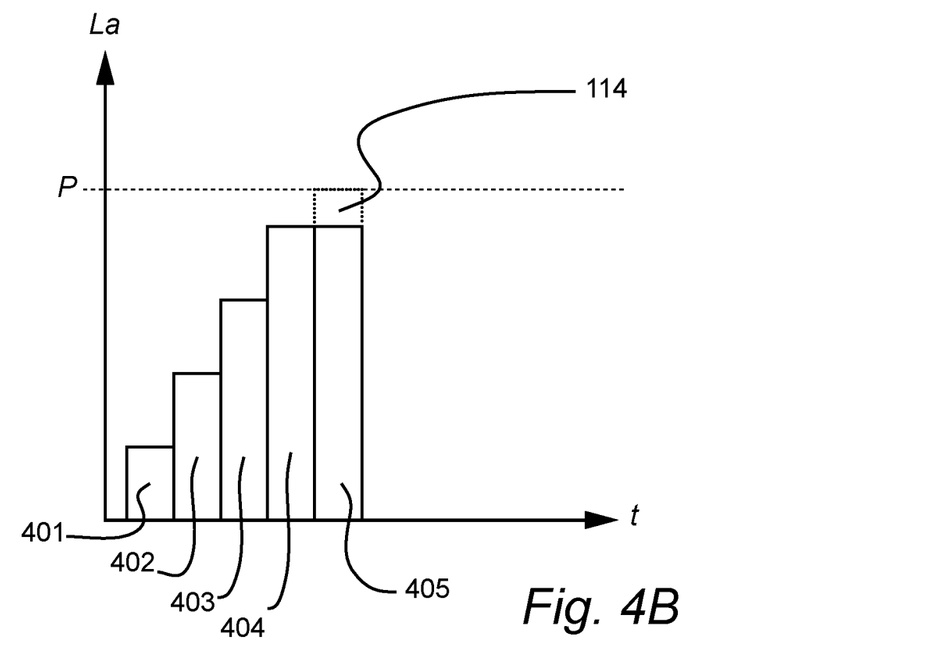
Figure 4C:
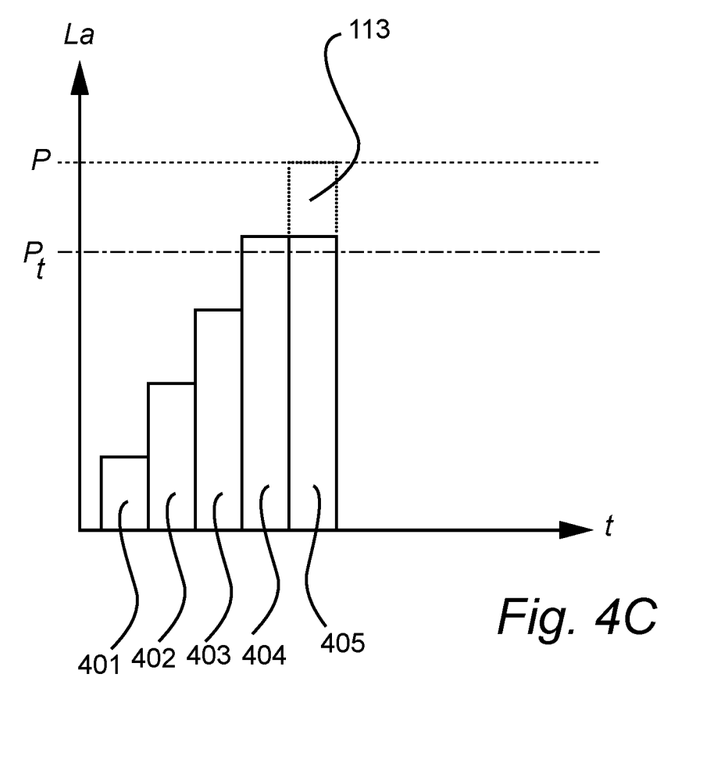

FIG. 4A-4C shows graphs exemplifying the operation of the control system 150 arranged on an articulated hauler 102 of FIG. 1B, for providing the indication to the wheel loader operator using the operator interface 202. FIG. 4A shows an example wherein the final bucket is a fully loaded bucket 113. The x-axis denotes time t and the y-axis denotes accumulated load La of the material provided to the articulated hauler 102. FIG. 4A further shows a desired payload P. A first 401, second 402, third 403 and fourth bar 404 shows the accumulated load La after a respective first, second, third and fourth bucket load provided to the articulated hauler 102 by the wheel loader 101. A fifth bar 405 shows the accumulated load La after receiving a final bucket load in the form of a fully loaded bucket in order to arrive at a final load of the articulated hauler being close to the desired payload P. The control system 150 of FIG. 2 compares the difference between the desired payload P and the first 401, second 402, third 403 and fourth bar 404 to determine if the next bucket is a final bucket and if the final bucket is a half-loaded bucket 114 or a fully loaded bucket 113.

FIG. 4B shows an example wherein the final bucket is determined to be a half-loaded bucket 114 and the final load of the articulated hauler 102 being close to the desired payload P.

FIG. 4C shows a graph exemplifying the operation of the control system 150 for providing the indication to the wheel loader operator wherein a predetermined threshold Pt is used to reduce the processing need of the processing circuitry 201 of the control system 150. FIG. 4C shows the predetermined threshold Pt being 80% of the desired payload P.

During loading of the articulated hauler 102, when the accumulated load of the articulated hauler 102 is below the predetermined threshold Pt, the processing circuitry 201 does not determine that a next bucket is a final bucket or that the next bucket is a half-loaded 114 or fully loaded bucket 113. In addition, the processing circuitry 201 does not send an instruction to the wheel loader operator interface 202. FIG. 4C shows the fourth bar 404, illustrating the accumulated load La after receiving four full bucket loads, extending above the predetermined threshold Pt. After supplying the fourth bucket load to the articulated hauler 102 the accumulated load La crosses the predetermined threshold Pt and the processing circuitry 201 performs the determination and instructing using the operator interface 202 that the next bucket is a final bucket and a fully loaded bucket 113.

Figure 5A:
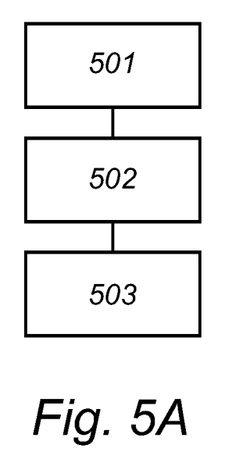
FIG. 5A-5C illustrates the processing steps for performing the method according to the present disclosure.
Figure 5B:
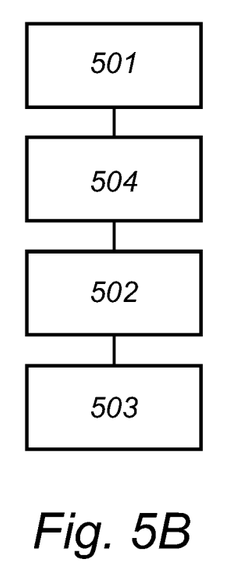
Figure 5C:
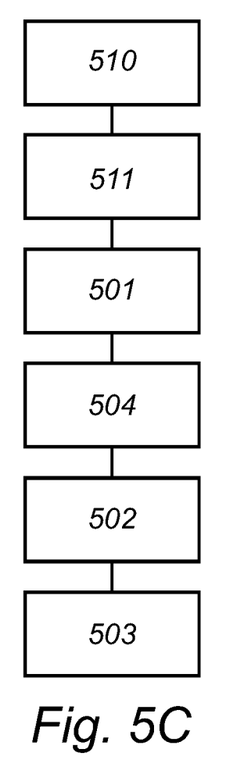

FIG. 5A-5C illustrates exemplary processing steps for performing the method according to the present disclosure using the control system 150. FIG. 5A shows the method during loading of a load receiving vessel 102. The method is illustrated using a load receiving vessel 102 in the form of the articulated hauler 102 disclosed in relation to FIG. 1B and a working machine 101 in the form of the wheel loader 101 disclosed in FIG. 1A. In a step 501, the processing circuitry 201 estimates a difference between the desired payload P for the articulated hauler 102 and an accumulated load La already provided to the articulated hauler 102 using the wheel loader 101. The accumulated load La is the accumulated weight of the buckets unloaded from the wheel loader 101 to the articulated hauler 102.

In step 502, the processing circuitry 201 determines if the difference between the accumulated load La and the desired payload P corresponds to an estimated weight of a half-loaded 114 bucket or a fully loaded bucket 113.

In step 503, the processing circuitry 201 instructs the operator of the wheel loader 101 that the next bucket to unload to the articulated hauler 102 should be a fully loaded bucket 113 or a half-loaded bucket 114. The indication is done using an operator interface 202 such as the example operator interfaces 202 disclosed in relation to FIG. 3. After being provided with the indication, the operator drives to the pile and fills the bucket with the appropriate load according to the indication, drives back to the articulated hauler 102 and unloads the bucket 110 of material into the bed or body 120 of the articulated hauler 102. After completing the loading of the articulated hauler 102, the articulated hauler 102 drives off, the control system 150 resets or returns to start over, and the wheel loader operator prepares for loading another articulated hauler 102 or load receiving vessel 102.

FIG. 5B illustrates the processing steps for performing the method according to an alternative embodiment, wherein a step 504 is performed after step 501 wherein the processing circuitry 201 estimates a difference between the desired payload P for the articulated hauler 102 and an accumulated load La already provided to the articulated hauler 102 using the wheel loader 102. In step 504 the processing circuitry 150 compares the estimated difference with a predetermined threshold, wherein the steps of determining 502 and instructing 503 are only performed if the estimated difference is above the predetermined threshold Pt as discussed in relation to FIG. 4C.

FIG. 5C illustrates the processing steps for performing the method according to a further embodiment, wherein a step 510, the processing circuitry 150, receives an indication of the weight of load of material currently within the bucket 110, and wherein a step 511 the processing circuitry 150 receives an indication of a weight of load currently received in the articulated hauler 102. The weight of the current load in the bucket 110 of the wheel loader 101 may be determined using a bucket load sensor arrangement and the weight of the load of material currently in the bed or body 120 of the articulated hauler 102 may be determined using an articulated body load sensor arrangement and transmitted to the processing circuitry 201 of the control system 150.

The present disclosure contemplates methods, devices and computer program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A control system for assisting an operator of a working machine, the working machine comprising a bucket arranged to receive a load to be unloaded to a load receiving vessel, the control system comprising processing circuitry arranged in communication with an operator interface, wherein the processing circuitry is adapted to:
estimate a difference between a desired payload for the load receiving vessel and an accumulated weight of buckets of loads already unloaded to the load receiving vessel using the bucket,
determine if the difference corresponds to an estimated weight for a fully loaded bucket or to an estimated weight for a half-loaded bucket, and
instruct, using the operator interface and based on the determination, an operator of the working machine to unload a fully loaded bucket or a half-loaded bucket to the load receiving vessel, wherein
the estimated weight for a fully loaded bucket corresponds to the heaviest bucket load of a plurality of consecutive bucket loads, or
the estimated weight for a fully loaded bucket corresponds to an average of a plurality of consecutive bucket loads.

2. The control system according to claim 1, wherein the processing circuitry only determines the difference if the accumulated weight of buckets of loads already unloaded to the load receiving vessel exceeds a predetermined threshold.

3. The control system according to claim 2, wherein the predetermined threshold is at least more than 80% of the desired payload for the load receiving vessel.

4. The control system according to claim 1, wherein the processing circuitry is further adapted to:
determine if the difference corresponds to an estimated weight for a quarter-loaded bucket or to an estimated weight for a three quarter-loaded bucket, and
instruct, using the operator interface and based on the determination, an operator of the working machine to unload a quarter-loaded bucket or a three quarter-loaded bucket to the load receiving vessel.

5. The control system according to claim 1, wherein the processing circuitry is further adapted to:
receive an indication of a weight of the load currently within the bucket, and
receive an indication of a weight of the load currently received at the load receiving vessel.

6. The control system according to claim 1, further comprising the operator interface.

7. The control system according to claim 1, wherein the operator interface is adapted to provide at least one of a visual, audio and haptic-based indication to the operator.

8. The control system according to claim 1, wherein the operator interface comprises a first and a second light source, the first light source provided for indicating a fully loaded bucket and the second light source provided for indicating a half-loaded bucket.

9. A working machine, comprising:
a control system according to claim 1, and
means for determining a weight of the load currently within the bucket.

10. The working machine according to claim 9, wherein the working machine is a loader.

11. A load receiving vessel, comprising:
a control system according to-claim 1,
load receiving means, and
means for determining a weight of the load currently received at the load receiving means.

12. The load receiving vessel according to claim 11 wherein the load receiving vessel is a hauler.

13. A loading station, comprising:
a control system according to claim 1, and
a weighing arrangement for receiving the load receiving vessel, weighing arrangement communicatively coupled to the processing circuitry,
wherein the processing circuitry is further adapted to determine a weight of the load currently received at the load receiving vessel.

14. A method for operating a control system arranged to assist an operator of a working machine, the working machine comprising a bucket arranged to receive a load to be unloaded to a load receiving vessel, the control system comprising processing circuitry arranged in communication with an operator interface, wherein the method comprises the steps of:
estimating, using the processing circuitry, a difference between a desired payload for the load receiving vessel and an accumulated weight of buckets of loads already unloaded to the load receiving vessel using the bucket,
determining, using the processing circuitry, if the difference corresponds to an estimated weight for a fully loaded bucket or to an estimated weight for a half-loaded bucket, and
instructing, using the operator interface and based on the determination, an operator of the working machine to unload a fully loaded bucket or a half-loaded bucket to the load receiving vessel, wherein
the estimated the weight for a fully loaded bucket corresponds to the heaviest bucket load of a plurality of consecutive bucket loads, or
the estimated the weight for a fully loaded bucket corresponds to an average of a plurality of consecutive bucket loads.

15. The method according to claim 14, further comprising the step of:
comparing the estimated difference with a predetermined threshold,
wherein the steps of determining and instructing are only performed if the estimated difference is above the predetermined threshold.

16. The method according to claim 14, wherein the estimated difference is at least more than 80% of the desired payload for the load receiving vessel.

17. The method according to claim 14, further comprising the steps of:
receiving, at the processing circuitry, an indication of a weight of the load currently within the bucket, and
receive, at the processing circuitry, an indication of a weight of the load currently received at the load receiving vessel.

18. A computer program product comprising a non-transitory computer readable medium having stored thereon computer program means for operating a control system arranged to assist an operator of a working machine, the working machine comprising a bucket arranged to receive a load to be unloaded to a load receiving vessel, the control system comprising processing circuitry arranged in communication with an operator interface, wherein the computer program product comprises:
code for estimating, using the processing circuitry, a difference between a desired payload for the load receiving vessel and an accumulated weight of buckets of loads already unloaded to the load receiving vessel using the bucket, code for determining, using the processing circuitry, if the difference corresponds to an estimated weight for a fully loaded bucket or to an estimated weight for a half-loaded bucket, and code for instructing, using the operator interface and based on the determination, an operator of the working machine to unload a fully loaded bucket or a half-loaded bucket to the load receiving vessel, wherein the estimated the weight for a fully loaded bucket corresponds to the heaviest bucket load of a plurality of consecutive bucket loads, or the estimated the weight for a fully loaded bucket corresponds to an average of a plurality of consecutive bucket loads.

* * * * *